United States Patent [19]

Matsui et al.

[11] Patent Number: 4,687,260
[45] Date of Patent: Aug. 18, 1987

[54] ANTISKID CONTROL DEVICE

[75] Inventors: Kazuma Matsui, Toyohashi; Yoshiyuki Hattori, Toyoake; Yuichi Imani, Hamamatsu; Akira Kuno, Obu; Yoshihisa Nomura, Toyota, all of Japan

[73] Assignees: Nippondenso Co., Ltd., Kariya; Toyota Jidosha Kabushiki Kaisha, Toyota, both of Japan

[21] Appl. No.: 793,760

[22] Filed: Nov. 1, 1985

[30] Foreign Application Priority Data

Nov. 1, 1984 [JP] Japan .................................. 59-228890
Apr. 7, 1985 [JP] Japan .................................. 60-80291
Apr. 24, 1985 [JP] Japan .................................. 60-86226
Jun. 6, 1985 [JP] Japan .................................. 60-123450

[51] Int. Cl.$^4$ .............................................. B60T 8/02
[52] U.S. Cl. ...................................... 303/119; 303/61; 303/116
[58] Field of Search ............... 303/116, 113, 115, 119, 303/61

[56] References Cited

U.S. PATENT DOCUMENTS 3,787,095  1/1974  Von Loewis ........................ 303/119
3,963,277  6/1976  Chiba .................................... 303/61
4,462,642  7/1984  Leiber .................................. 303/119

FOREIGN PATENT DOCUMENTS

49-28307  7/1974  Japan .
49-32494  8/1974  Japan .
2065807   7/1981  United Kingdom ................ 303/116

Primary Examiner—Duane A. Reger
Assistant Examiner—Matthew C. Graham
Attorney, Agent, or Firm—Cushman, Darby & Cushman

[57] ABSTRACT

An antiskid control device including a main line system, a first oil hydraulic source generating a pressurized oil and supplying the oil to wheel cylinders through the main line system, a subline system, and a second oil hydraulic source generating a pressurized oil and supplying the oil to the wheel cylinders through the subline system. The main line system and the first oil hydraulic source are provided for a usual braking operation. The subline system and the second oil hydraulic source are provided for an antiskid control. The main line system has a cut-off valve which opens the main line system in the usual braking operation and closes the main line system in the antiskid control. The subline system has a switching valve which opens and closes the subline system according to a locking condition of the wheel during the antiskid control. The second oil hydraulic source generates a pressurized oil when a locking condition is sensed.

15 Claims, 12 Drawing Figures

ANTISKID CONTROL DEVICE

BACKGROUND OF THE INVENTION

1. Field of the Invention

The present invention relates to a brake system of a vehicle. More particularly, it relates to an antiskid control device to prevent wheels of the vehicle from locking when the brake system is operated, so that drivability of the vehicle is maintained.

2. Description of the Related Art

In a brake system of a vehicle, a master cylinder connected to a brake pedal and a wheel cylinder provided in a brake mechanism of the wheel are connected to each other by a piping system. An antiskid control device, as disclosed in Japanese Examined Patent Publications Nos. 49-28307 and 49-32494 for example, has a construction in which, in the piping system, a valve for discharging pressurized oil from the wheel cylinder and a pump for supplying pressurized oil into the wheel cylinder are provided. Thus, when a locking condition of the wheel is sensed, the pressurized oil in the wheel cylinder is quickly released, then, when the wheel returns to a braking condition, the pump gradually supplies pressurized oil to the wheel cylinder.

However, in this brake system, when an antiskid control is carried out, a part of the pressurized oil discharged from the pump flows into the master cylinder, causing pressure pulsations in the master cylinder. As a result, a kickback phenomenon, in which the brake pedal is pushed back against the foot of the driver by the pressure in the master cylinder occurs, and an unpleasant feeling is given to the driver.

SUMMARY OF THE INVENTION

Therefore, an object of the present invention is to provide an antiskid control device in which the kickback phenomenon does not occur during an antiskid control.

According to the present invention, there is provided an antiskid control device comprising a first oil hydraulic source, a second oil hydraulic source, a main line system having a main line connecting the first oil hydraulic source to the wheel cylinders, and a subline system having a subline connecting the second oil hydraulic source to the wheel cylinders. The first oil hydraulic source generates pressure in the oil for a usual brake operation while the second oil hydraulic source generates pressure in the oil for an antiskid control. The main line system further has a cut-off valve for opening and closing the main line, and the antiskid control device further comprises a means for switching the cut-off valve to maintain the main line in a normally open state, and to close the main line when a locking condition occurs in the wheels of the vehicle. The subline system further has a switching valve opening the closing the subline, and the antiskid control device further comprises a means to open or close the switching valve according to the locking condition of the wheel.

BRIEF DESCRIPTION OF THE DRAWINGS

The present invention may be more fully understood from the description of the preferred embodiments of the invention set forth below, together with the accompanying drawings, in which.

DESCRIPTION OF THE PREFERRED EMBODIMENTS

The present invention will now be described with reference to the following preferred embodiments.

Figure 1:
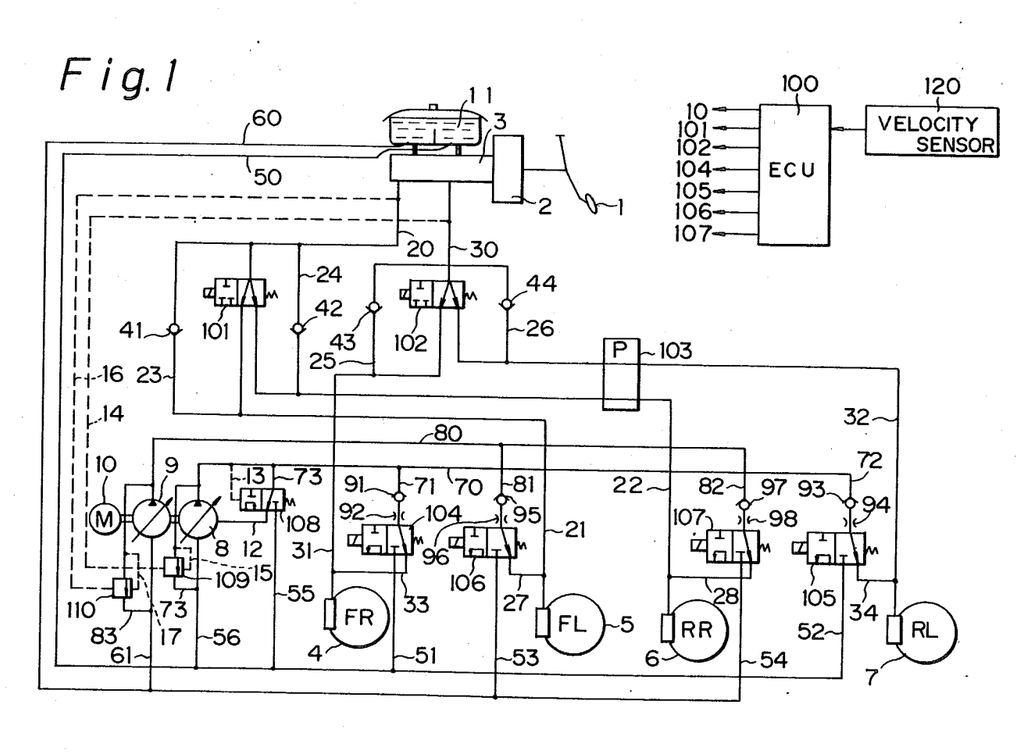
FIG. 1 is a hydraulic circuit of a first embodiment of the present invention.

FIG. 1 shows a first embodiment of the present invention. This embodiment is an example in which the present invention is applied to a so-called FF (front-engine-front-drive) type vehicle provided with a brake system having a well-known X-type piping system. That is, the brake system is constructed in such a manner that a wheel cylinder 4 of the front right (FR) wheel and a wheel cylinder 7 of the rear left (RL) wheel are supplied with brake oil through the same piping system, and a wheel cylinder 5 of the front left (FL) wheel and a wheel cylinder 6 of the rear right (RR) wheel are supplied with brake oil through the same piping system. A brake pedal 1 is connected to a master cylinder 3 through a brake booster 2, so that an oil pressure generated by operation of the brake pedal 1 is transmitted to the wheel cylinders 4,5,6, and 7 of the front right (FR), front left (FL), rear right (RR), and rear left (RL) wheels, respectively, to carry out a braking operation. The brake booster 2 is, as previously known, operated by a negative pressure occurring in an intake manifold of the engine, and this pressure is exerted on a push-rod connected to a piston (not shown) of the master cylinder 3 in response to an operation of the brake pedal 1, to reduce the force needed by the driver when operating the brake pedal 1.

The master cylinder 3 is provided with two pressure chambers (not shown) from which brake oil is discharged at the same pressure. The chambers are connected to first and second main lines. The first main line has a supply line 20 and brake lines 21 and 22. The second main line has a supply line 30 and brake lines 31 and 32.

The supply line 20 is connected to a cut-off valve 101 which is connected to the brake line 21 communicating with the wheel cylinder 5 of the front left (FL) wheel and to the brake line 22 communicating with the wheel cylinder 6 of the front right (RR) wheel. A connecting line 23 provided with a check valve 41 connects the supply line 20 and the brake line 21. A check line 24 having a check valve 42 connects the supply line 20 and the brake line 22. The cut-off valve 101 is a three-port-two-position valve which allows the supply line 20 to communicate with the brake lines 21 and 22 in a first valve position shown in the drawing, and shuts off communication between the supply line 20 and the brake lines 21 and 22 in a second valve position not shown in the drawing. The check valves 41 and 42 allow the oil in the connecting lines 23 and 24 to flow only from the brake lines 21 and 22 to the supply line 20, to ensure that the pressures in the brake lines 21 and 22 are kept below a constant value.

Similarly, the supply line 30 is connected to a cut-off valve 102 which is connected to the brake line 31 communicating with the wheel cylinder 4 of the front right wheel and to the brake line 32 communicating with the wheel cylinder 7 of the rear left wheel. A connecting line 25 provided with a check valve 43 connects the supply line 30 and the brake line 31, and connecting line 26 provided with a check valve 44 connects the supply line 30 and the brake line 32. The cut-off valve 102 is a three-port-two-position valve which allows the supply line 30 to communicate with the brake lines 31 and 32 in a first valve position shown in the drawing, and shuts off communication between the supply line 30 and the brake lines 31 and 32 in a second valve position not shown in the drawing. The check valves 43 and 44 allow the oil in the connecting lines 25 and 26 to flow only from the brake lines 31 and 32 to the supply line 30.

A previously known proportioning valve 103 is provided in the brake lines 22 and 32 connected to the wheel cylinders 6 and 7 of the left (RL) and right (RR) rear wheels, respectively, so that brake oil having a pressure lower than the discharge pressure of the master cylinder 3 is supplied to the wheel cylinders 6 and 7 of the left (RL) and right (RR) rear wheels when the oil pressure in the brake lines 22 and 32 is more than a predetermined constant value.

A usual brake operation is carried out by the construction described above. In this state, the cut-off valves 101, 102 are positioned in the first valve position, respectively. Oil pressure generated in the master cylinder 3 by operation of the brake pedal 1 is transmitted to the wheel cylinder 5 of the front left (FL) wheel through the supply line 20 and the brake line 21, to the wheel cylinder 6 of the rear right (RR) wheel through the supply line 20 and the brake line 22, to the wheel cylinder 4 of the front right (FR) wheel through the supply line 30 and the brake line 31, and to the wheel cylinder 7 of the rear left (RL) wheel through the supply line 30 and the brake line 32, respectively.

The construction of the system for carrying out an antiskid operation is described below.

The hydraulic pumps 8 and 9 are driven by a hydraulic motor 10, as described later, to suck brake oil through branch lines 56 and 61 connected to oil lines 50 and 60, respectively, which oil lines 50 and 60 communicate with a reservoir 11 mounted on the master cylinder 3, and to supply the brake oil to the wheel cylinders 4, 5, 6, and 7 through sublines 70 and 80.

A branch line 71 of the subline 70 can communicate with a branch line 33 of the brake line 31 through a switching valve 104. The branch line 71 has a check valve 91 for preventing brake oil from flowing upstream of the switching valve 104 and an orifice 92 for restricting the flow rate therethrough. The switching valve 104 is a three-port-two-position valve; one outlet port being connected to the brake line 33, and the other outlet port being connected to a branch line 51 of the oil line 50. Thus, the switching valve 104 allows the branch line 71 to communicate with the branch line 33 at the first valve position (the normal valve position) shown in the drawing, and the branch line 33 to communicate with the branch line 51 at the second valve position (the offset valve position) not shown in the drawing. Therefore, when the switching valve 104 is positioned at the first valve position, brake oil discharged from the pump 8 is supplied to the wheel cylinder 4 of the front right (FR) wheel through the subline 70 and the branch line 33. Conversely, when the switching valve 104 is positioned at the second valve position, brake oil in the wheel cylinder 4 is released to the reservoir 11 through the branch line 33, the branch line 51, and the oil line 50.

A branch line 72 of the subline 70 can communicate with a branch line 34 of the brake line 32 through a switching valve 105. A check valve 93 and an orifice 94 are provided in the branch line 72. The switching valve 105 is a three-port-two-position valve; one outlet port being connected to the branch line 34, and the other outlet port being connected to a branch line 52 of the oil line 50. Thus, the switching valve 105 allows the branch line 72 to communicate with the branch line 34 to lead brake oil discharged from the pump 8 to the wheel cylinder 7 of the rear left (RL) wheel when the switching valve 105 is positioned at the first valve position shown in the drawing. Conversely, the switching valve 105 allows the branch line 34 to communicate with the branch line 52 to release brake oil in the wheel cylinder 7 of the rear left (RL) wheel to the reservoir 11 when the switching valve 105 is positioned at the second valve position not shown in the drawing.

A branch line 81 of the subline 80 can communicate with a branch line 27 of the brake line 21 through a switching valve 106. A check valve 95 and an orifice 96 are provided in the branch line 81. The switching valve is a three-port-two-position valve; one outlet port being connected to the branch line 27, and the other outlet port being connected to a brake line 53 of the oil line 50. Thus, the switching valve 106 allows the branch line 81 to communicate with the branch line 27 to lead brake oil discharged from the pump 9 to the wheel cylinder 5 of the front left (FL) wheel when the switching valve 106 is positioned at the first valve position shown in the drawing. Conversely, the switching valve 106 allows the branch line 27 to communicate with the brake line 53 to release brake oil in the wheel cylinder 5 of the front left (FL) wheel to the reservoir 11 when the switching valve 106 is positioned at the second valve position not shown in the drawing.

The same construction as described above is provided in a branch line 82 of the subline 80. That is, the branch line 82 is provided with a check valve 97 and an orifice 98, and is connected to a branch line 28 and a brake line 54 through a switching valve 107. The switching valve 107 leads brake oil to the wheel cylinder 6 of the rear right (RR) wheel when positioned at the first valve position, and release brake oil in the wheel cylinder 6 of the rear right (RR) wheel to the reservoir 11 when positioned at the second valve position. The switching valves 106, 107, 108, and 109 are solenoid valves.

The variable delivery pumps 8 and 9 are well known radial-piston-type pumps, which change the discharge capacities by displacing a cam ring (not shown). A control valve 108 is provided for displacing the cam ring. The control valve 108 is a three-port-two-position valve; the inlet port being connected to a branch line 73 of the subline 70, one outlet port being connected to a branch line 55 of the oil line 50, and the other outlet port being connected to a lead line 12. The lead line 12 extends to an end surface of the cam ring to feed oil pressure onto that end surface. Pressure in the subline 70 is transmitted to the control valve 108 through a lead line 13 branched from the subline 70 and the control valve 108 is switched according to that pressure. The control valve 108 allows the branch line 73 to communicate with the lead line 12 to feed pressurized oil to the cam ring when the valve 108 is in the first valve position shown in the drawing. Conversely, when the pressure in the subline 70 becomes high and thus switches the control valve 108 to the second valve position not shown in the drawing, the control valve 108 allows the lead line 12 to communicate with the branch line 55 to release the oil pressure acting on the cam ring.

Figure 2:
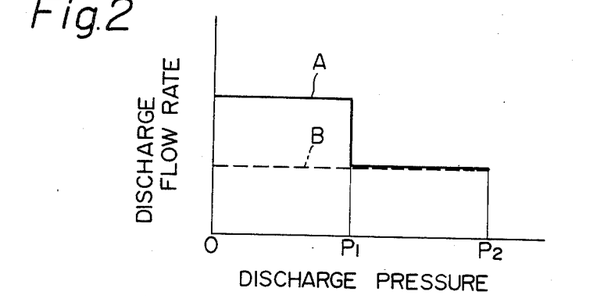
FIG. 2 is a diagram showing a relationship between a discharge pressure and a discharge flow rate.

The variable delivery pumps 8 and 9 are driven by one motor to discharge the same quantity of pressurized oil. As described above, the cam rings of the pumps 8 and 9 are switched by the control valve 108, whereby a discharge flow rate A of the pumps 8 and 9 is set to be relatively high when the discharge pressure is below $P_1$, and to be relatively low when the discharge pressure is above $P_1$, as shown in FIG. 2. The maximum discharge pressure is $P_2$. Note that the broken line B in the drawing shows a discharge flow rate of a constant delivery pump.

Figure 3:
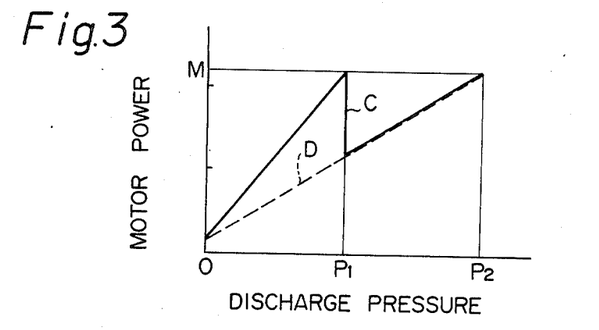
FIG. 3 is a diagram showing a relationship between a discharge pressure and a motor power.

Since the pumps 8 and 9 change the discharge flow rate according to the discharge pressure as described above, a power C output by the motor 10 changes according to that discharge pressure as shown in FIG. 3. That is, the power output by the motor 10 linearly increases to reach the maximum value M when the discharge pressure changes from 0 to $P_1$, and the power output by the motor 10 becomes a value half that of the maximum value M at the discharge pressure $P_1$ and linearly increases to reach the maximum value M again when the discharge pressure changes from $P_1$ to $P_2$. Accordingly, when the discharge pressures of the pumps 8 and 9 are low, a motor power much larger than a motor power of a constant delivery pump shown by a break line D is obtained, so that a low pressure flow rate becomes large without using a large sized motor.

The oil hydraulic pump 8 has inlet and outlet ports to accommodate the flow of the pressurized oil therethrough. The inlet and oulet ports are bypassed by a relief line 73 provided with a relief valve 109. Pressure in the supply line 30 and pressure in the relief line 73 are conducted through lead lines 14 and 15 to the relief valve 109, respectively, to open the relief line 73 when the pressure in the relief line 73 is higher than the pressure in the supply line 30, so that the discharge pressure of the pump 8 is suppressed to be kept lower than the discharge pressure of the master cylinder 3. Similarly, the oil hydraulic pump 9 has inlet and outlet ports which are bypassed by a relief line 83 having a relief valve 110. Pressure in the supply line 20 and pressure in the relief line 83 is conducted to the relief valve 110 through lead lines 16 and 17, respectively, to open the relief line 83 when the pressure in the relief line 83 is higher than the pressure in supply line 20, so that the discharge pressure of the pump 9 is suppressed to be kept lower than the discharge pressure of the master cylinder 3.

An antiskid control is carried out when any one of the wheels is judged to be locked, in other words, when deceleration or the slip ratio of the wheel is judged to be too large. The deceleration and slip ratio of the wheel is calculated by an electronic control unit (ECU) 100 provided with a microcomputer. For this purpose, a velocity sensor 120 is mounted near each wheel and connected to the ECU 100. The ECU 100 starts the motor 10 and switches the cut-off valves 101 and 102 from the first valve position to the second valve position when the ECU 100 decides to start an antiskid control. During the antiskid control, the ECU 100 switches the switching valves 104, 105, 106, and 107 according to the deceleration and slip ratio of the wheel. Note that the switching valves 105 and 107 of the rear wheels are both switched to the same valve position.

Operation of the above embodiment is described below with reference to FIG. 4.

In a non-operative condition in which a braking operation is not carried out, the cut-off valves 101 and 102 are positioned at the first valve position, respectively. Therefore, if force is exerted on the brake pedal 1, pressurized oil discharged from the master cylinder 3 is fed to the wheel cylinders 4, 5, 6, and 7 through the brake lines 31, 21, 22, and 32, respectively, so that pressure in these wheel cylinders immediately rises. In the drawing, if the brake pedal 1 is operated at the time $T_0$, the pressure P in the wheel cylinder quickly rises so that the velocity $V_W$ of the wheel immediately drops from the time $T_1$. The velocity $V_V$ of the vehicle body also begins to drop from the time $T_1$, but the velocity $V_W$ drops more quickly than the velocity $V_V$.

Then, if the velocity $V_W$ of the wheel becomes lower than a standard velocity $V_J$, which is lower than the velocity $V_V$ by a predetermined value as shown in FIG. 2, the ECU 100 judges that slip ratio of the wheel is increasing, and outputs an antiskid control command signal. As a result, the cut-off valves 101 and 102 are switched to the second valve position and the motor 10 is rotated so that the wheel cylinders 4, 5, 6, and 7 are supplied pressurized oil discharged from the pumps 8 and 9. The discharge pressure of the pumps 8 and 9 begins to gradually rise from the time $T_2$, and reach $P_1$ at the time $T_3$, and then to reach $P_2$. That is, the discharge flow rates of the pumps 8 and 9 are large between the time $T_2$ and the time $T_3$ as shown in FIG. 2 because the discharge pressure is smaller than $P_1$. The discharge flow rates of the pumps 8 and 9 are relatively small after the time $T_3$. Note that a broken line E in FIG. 4 shows a variation of a discharge pressure of a constant delivery pump shown by the broken line B in FIG. 2.

At the same time, when the cut-off valves 101 and 102 are switched to reduce pressure in a wheel cylinder, any one of the switching valves 104, 105, 106, and 107 corresponding to that wheel cylinder is switched to the second valve position, so that the brake oil. in the wheel cylinder is released to the reservoir 11 through the oil line 50. The pressure in the wheel cylinder rises for a while after the time $T_2$, then begins to drop. Thus, if for example, the wheel velocity rate begins to decrease, so that the wheel cylinder pressure should be increased, the switching valve is switched to the first valve position at the time $T_3$. As a result, brake oil is gradually supplied to the wheel cylinder through the branch lines 71, 72, 81, or 82, which has a relatively large flow resistance so that the wheel cylinder pressure increases gradually.

Subsequently, pressures supplied to the wheel cylinders 4, 5, 6, and 7 are calculated by the ECU 100 according to the deceleration or slip ratio of each wheel, so that an appropriate oil pressure is supplied to the wheel cylinders 4, 5, 6, and 7 by selecting an ON-OFF signal duty ratio to be output to the switching valves 104, 105, 106, and 107. According, the velocity $V_W$ of the wheel is controlled so as to maintain a value near to the standard velocity $V_J$. Antiskid control is halted by stopping the vehicle or turning off a brake switch provided near the brake pedal 1. At this time, the cut-off valves 101 and 102 are switched to the first valve position.

Figure 5:
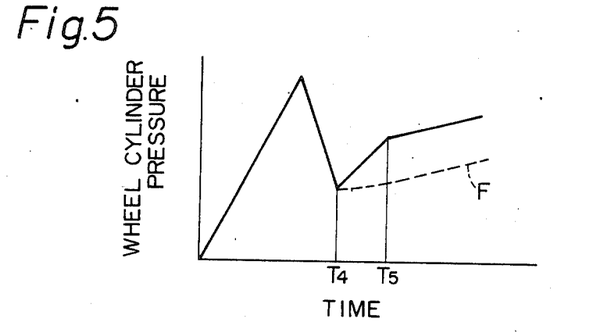
FIG. 5 is a diagram showing a variation of a wheel cylinder pressure.

In an antiskid control such as described above, since the discharge flow rates of the pumps 8 and 9 quickly rise immediately after the motor 10 has started, the time $T_4$ when the pressure in the wheel cylinder begins to increase can be advanced to the maximum as shown in FIG. 5. Further, between the time $T_4$ and the time $T_5$ when the discharge flow rates of the pumps 8 and 9 are large (shown by A in FIG. 2), the wheel cylinder pressure can be increased more quickly. Therefore, the pressure in the wheel cylinder can be raised more quickly, so that the responsiveness of the antiskid control device is improved as compared to the case in which a constant delivery pump is used, as shown by a broken line F in FIG. 5.

Figure 6:
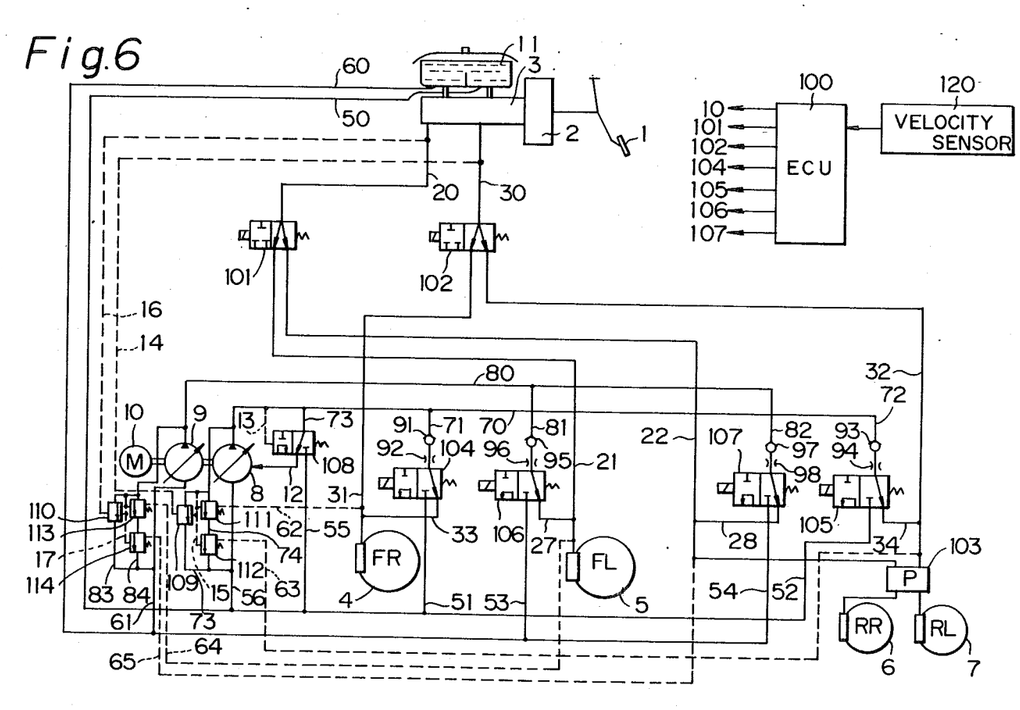
FIG. 6 is a hydraulic circuit of a second embodiment of the present invention.

FIG. 6 shows a second embodiment of the present invention. In the drawing, the outlet and inlet ports of the pump 8 are bypassed by a first relief line 73 provided with a main relief valve 109. Pressure in the supply line 30 and pressure in the relief line 73 is transmitted to the main relief valve 109 through the lead line 14 and the lead line 15, respectively, so that the relief line 73 is opened when the pressure therein is higher than the pressure in the supply line 30, and the relief line 73 is closed in all other conditions. Accordingly, a discharge pressure of the pump 8 is kept lower than the pressure in the supply line 30, i.e., the discharge pressure of the master cylinder 3. Upstream and downstream portions of the relief valve 109 are bypassed by a second relief line 74 provided with subrelief valves 111 and 112. Pressure in the first relief line 73 and pressures in the brake line 31 of the front right wheel cylinder 4 and in the brake line 32 of the rear left wheel cylinder 7, are transmitted to the subrelief valves 111 and 112 through the lead line 14 and through lead lines 62 and 63, respectively. The subrelief valves 111 and 112 are biased by springs to the side of the lead line 15. Therefore, the subrelief valve 111 opens the second relief line 74 when the discharge pressure of the pump 8 is higher than a pressure in the front right (FR) wheel cylinder 4 by a certain constant value (for example 20 kg/cm), and closes the second relief line 74 in any other condition. Similarly, the subrelief valve 112 opens the second relief line 74 when the discharge pressure of the pump 8 is higher than a pressure in the rear left wheel cylinder 7 by a certain constant value, and closes the second relief line 74 in any other condition. That is, the second relief line 74 is opened when the discharge pressure of the pump 8 is higher than the pressure in the wheel cylinders 4 and 7, so that the discharge pressure of the pump 8 is suppressed and kept below a constant value. Thus, the discharge pressure of the pump 8 is lower than the pressure of the master cylinder 3 and is lower than the sum of the pressures of the wheel cylinders 4 and 7 and a predetermine value.

Similarly, the outlet and inlet ports of the pump 9 are bypassed by a first relief line 83 provided with a main relief valve 110, to which is transmitted pressure in the supply line 20 through the lead line 16 and pressure in the first relief line 83 through the lead line 17. The main relief valve 110 opens the first relief line 83 when the discharge pressure of the pump 9 is higher than the pressure in the master cylinder 3, so that the discharge pressure of the pump 9 is kept lower than the pressure in the master cylinder 3. Upstream and downstream portions of the relief valve 110 are bypassed by a second relief line 84 provided with subrelief valves 113 and 114. Pressure in the first relief line 83 through the lead line 17 and pressure in the brake line 21 of the front left (FL) wheel cylinder 5 and in the brake line 22 of the rear right (RR) wheel cylinder 6 are transmitted to the subrelief valves 113 and 114 through lead lines 64 and 65, respectively. The subrelief valves 113 and 114 are biased by springs to the side of the lead line 17. The subrelief valves 113 and 114 open the second relief line 84 when the discharge pressure of the pump 9 is higher than the pressure in the wheel cylinders 5 and 6 by a certain constant value, so that the discharge pressure of the pump 9 is kept lower than the pressure in the master cylinder 5 and 6 by a certain constant value. Thus, the discharge pressure of the pump 9 is lower than the pressure of the master cylinder 3 and is lower than the sum of the pressures of the wheel cylinders 5 and 6 and a predetermined value.

In this embodiment, the proportioning valve 103 is provided downstream of the switching valves 105 and 107 in the brake lines 22 and 32. Note, the connecting lines 23, 24, 25, and 26 are not provided in this embodiment. The remaining construction is the same as that of the first embodiment described above. Also the operation of an antiskid control in the second embodiment is carried out in a manner basically similar to that of the first embodiment as described with reference to FIGS. 2, 3, 4, and 5.

Figure 7:
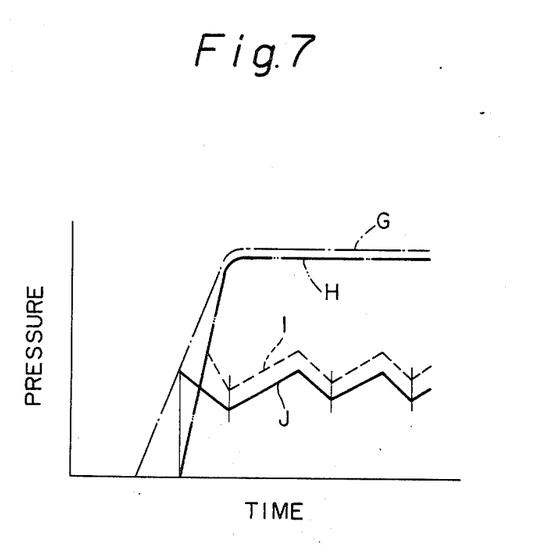
FIG. 7 is a diagram showing a variation of a pump discharge pressure and a wheel cylinder pressure.

A variation of a discharge pressure of the pumps 8 and 9 during an antiskid control is described below with reference to FIG. 7. In the drawing, a one-dot chain line G, a two-dot chain line H, a broken line I, and a solid line J show a discharge pressure of the master cylinder 3, a discharge pressure of a pump in a prior art, discharge pressures of the pumps 8 and 9 in the embodiment, and pressures in the wheel cylinders 4, 5, 6, and 7, respectively. As understood from this drawing, although the discharge pressure of the conventional pump is constant and nearly the same as that of the master cylinder 3 during an antiskid control, according to this embodiment, the discharge pressures of the pumps 8 and 9 vary in response to the pressures of the wheel cylinders 4, 5, 6, and 7, and are higher than the pressures in the wheel cylinders 4, 5, 6, and 7 by a constant value.

In an antiskid control as described above, the discharge pressures of the pumps 8 and 9 (shown by the line I) are lower than the pressure of the master cylinder 3, and are lower than the sum of the pressures in the wheel cylinders 4, 5, 6, and 7 and a predetermined constant pressure. Therefore, power of the motor 10 for driving the pumps 8 and 9 can be restrained to the lowest value needed. Accordingly, power loss at the motor 10 is reduced, and a pressure rise in the motor 10 when increasing the pressure in the wheel cylinders 4, 5, 6, and 7 becomes constant, so that an antiskid control is carried out stably.

Note that, in the second embodiment, the pumps 8 and 9 may be constant delivery pumps.

Figure 8:
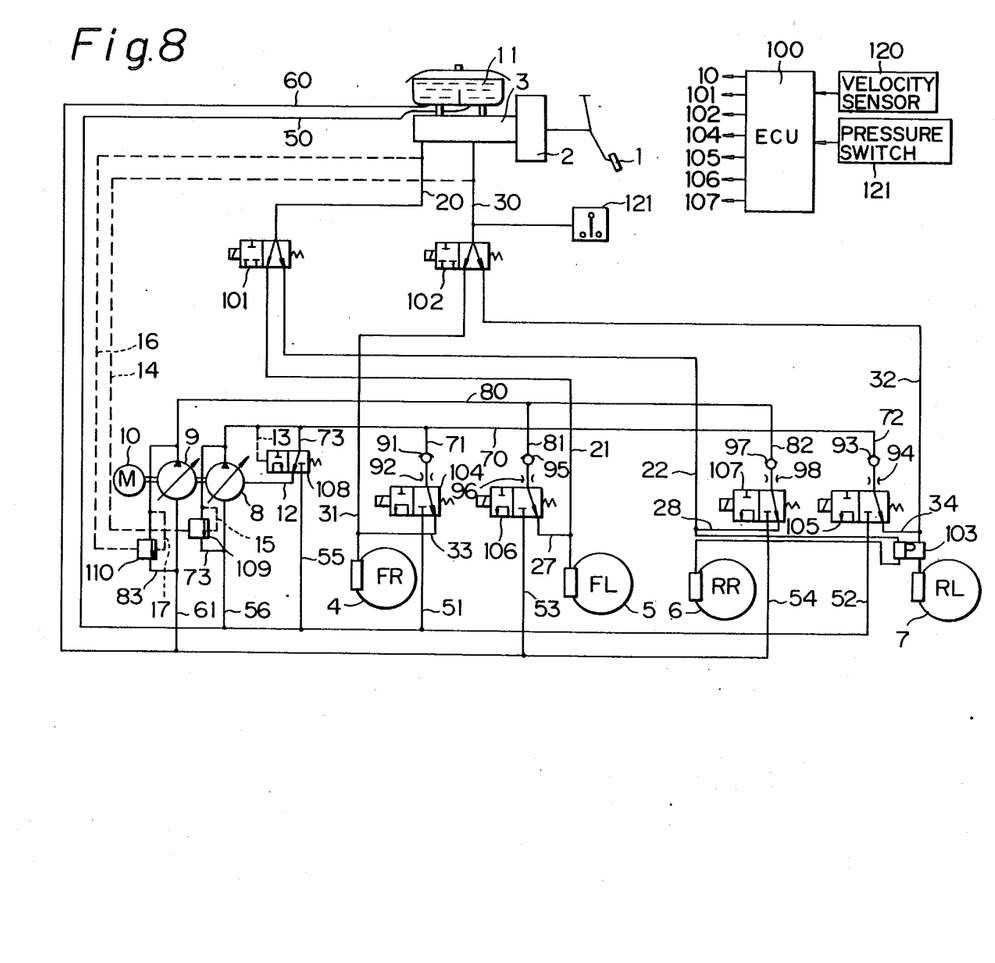
FIG. 8 is a hydraulic circuit of a third embodiment of the present invention.

FIG. 8 shows a third embodiment of the present invention. In this embodiment, the motor 10 is constructed to start when a discharge pressure from the master cylinder 3 is more than a predetermined value (for example between 30 and 50 kg/cm$^2$), regardless of whether or not an antiskid control is carried out. For this purpose, the supply line 30 is provided with a pressure switch 121 for sensing a pressure in the supply line 30. A contact point in pressure switch 121 is closed when the pressure in the supply line 30 becomes higher than a predetermined value, and is opened during any other condition. The pressure sensor 121 is connected to the ECU 100, which closes a motor relay (not shown) according to a signal transmitted from the pressure sensor 121 so that the motor 10 is started. The remaining construction is the same as that of the first embodiment except that the proportioning valve 103 is provided downstream of the switching valves 105 and 107.

Figure 9:
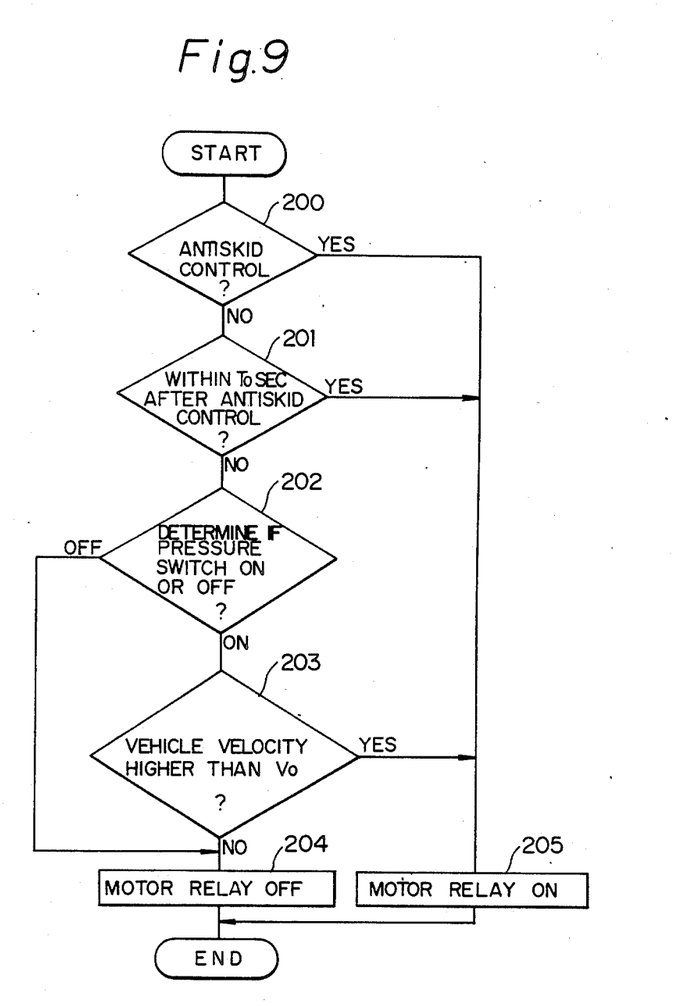
FIG. 9 is a flow chart of a program carried out by an ECU.

FIG. 9 shows a flow chart of a program carried out by the ECU 100 for controlling the motor 10. In step 200 it is determined whether or not an antiskid control is being carried out. If an antiskid control is being carried out, step 205 is carried out so that the motor relay is turned ON to start the motor 10. If at step 200, an antiskid control is not being carried out, step 201 is carried out to judge whether or not $t_0$ seconds has elapsed since the antiskid control was halted. If $t_0$ seconds has elapsed from the halting of the antiskid control, the program procedure moves to step 205 to maintain the motor 10 in a rotating state. If $t_0$ second has not elapsed, the procedure moves to step 202. That is, step 202 is carried out before an antiskid control is started, or after $t_0$ seconds has elapsed from the halting of the antiskid control.

At step 202, it is determined whether or not the pressure switch 121 is turned ON or OFF. If the pressure switch 121 is not turned ON, step 204 is carried out to output a signal for turning OFF the motor relay, so that the motor 10 is stopped if the motor 10 has been rotating. If the pressure switch 121 is turned ON, namely, if a pressure in the supply line 30 is higher than a predetermined value, step 203 is carried out to judge whether or not the vehicle velocity is more than a predetermined value $V_0$. If the vehicle velocity is larger than the value $V_0$, step 205 is carried out to turn ON the motor relay, and if the vehicle velocity is lower than the value $V_0$, step 204 is carried out to turn OFF the motor relay.

Thus, even if an antiskid control is not started, the motor 10 is driven if the pressure in the supply line 30 is higher than a predetermined value and the vehicle velocity is faster than a predetermined value. Therefore, the motor 10 can be started regardless of the operation of the brake pedal 1, so that the frequency of use of the motor 10 is reduced to improve the durability thereof. Since the motor 10 is rotated prior to starting an antiskid control if a vehicle velocity is relatively high and a pressure in the supply line 30 is relatively high, discharge pressures of the pumps 8 and 9 have already become sufficiently high for an antiskid control when the antiskid control is started, so that the antiskid control is carried out in a stable condition.

Figure 10:
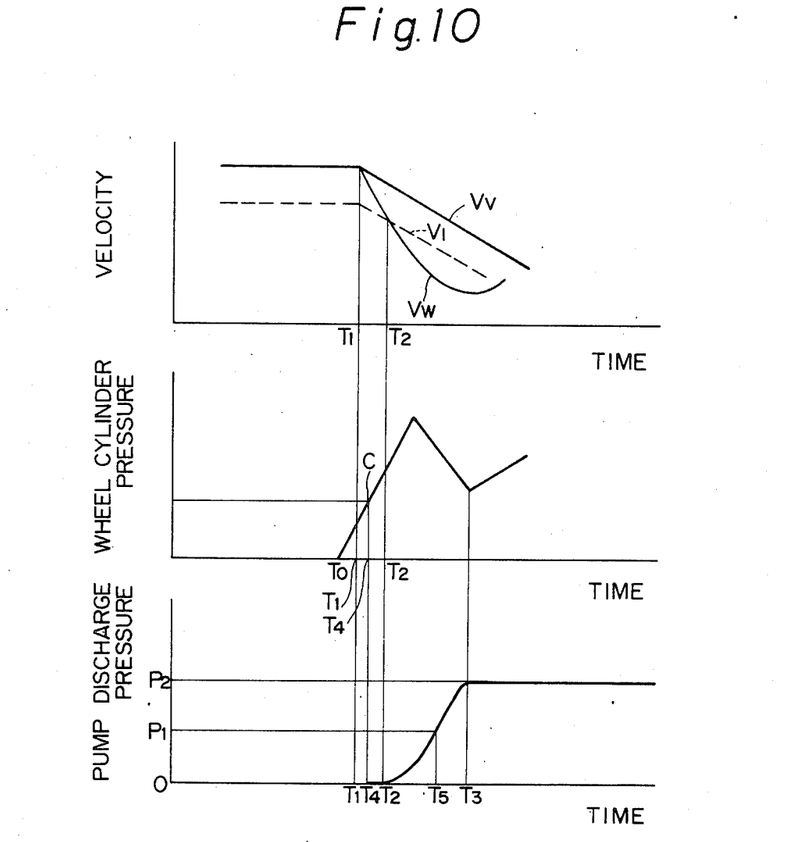
FIG. 10 is a diagram showing a variation of a vehicle velocity, a wheel velocity, a wheel cylinder pressure, and a discharging pressure.

In a braking operation, if the vehicle velocity $V_W$ becomes lower than the standard velocity $V_I$ shown by the broken line in FIG. 10, the ECU 100 judges that a slip ratio is increasing and outputs an antiskid control command signal, whereby the cut-off valves 101, 102 are switched to the second valve positions so that an antiskid control is started. Supposing that, at the time $T_4$, a pressure in the piping system is higher than a constant value C and the pressure switch 121 is turned ON so that the motor 10 starts. That is, at the time $T_2$ when an antiskid control is started, the pumps 8 and 9 have already started. Thus, a discharge pressure of the pumps 8 and 9 start to gradually rise from the time $T_4$, and become $P_1$ at the time $T_5$, and then becomes $P_2$. That is, the discharge flow rates of the pumps 8 and 9 are relatively large between the time $T_4$ and the time $T_5$, as shown in FIG. 2, and are relatively small after the time $T_5$.

As soon as the cut-off valves 101 and 102 are switched, the switching valve among the switching valves 104, 105, 106, and 107 corresponding to the wheel cylinder of the wheel in a locking condition is switched to the second valve position to reduce pressure in the wheel cylinder. As a result, brake oil in the wheel cylinder is released to the reservoir 11 through the oil line 50. The pressure in the wheel cylinder rises for a while from the time $T_2$, but soon begins to decrease. Then, deceleration of the wheel is reduced so that the pressure in the wheel cylinder must again be increased, for example, at the time $T_3$, and the switching valve is switched to the first valve position. As a result, brake oil is gradually supplied to the wheel cylinder through the corresponding branch line 71, 72, 81, or 82 having a large flow resistance, and thus the pressure in the wheel cylinder increases relatively slowly. At this time, the discharge pressure of the pumps has already reached $P_2$, so that the wheel cylinder pressure rises smoothly.

Note that, in this embodiment, the pumps 8 and 9 may be constant delivery pumps.

Figure 11:
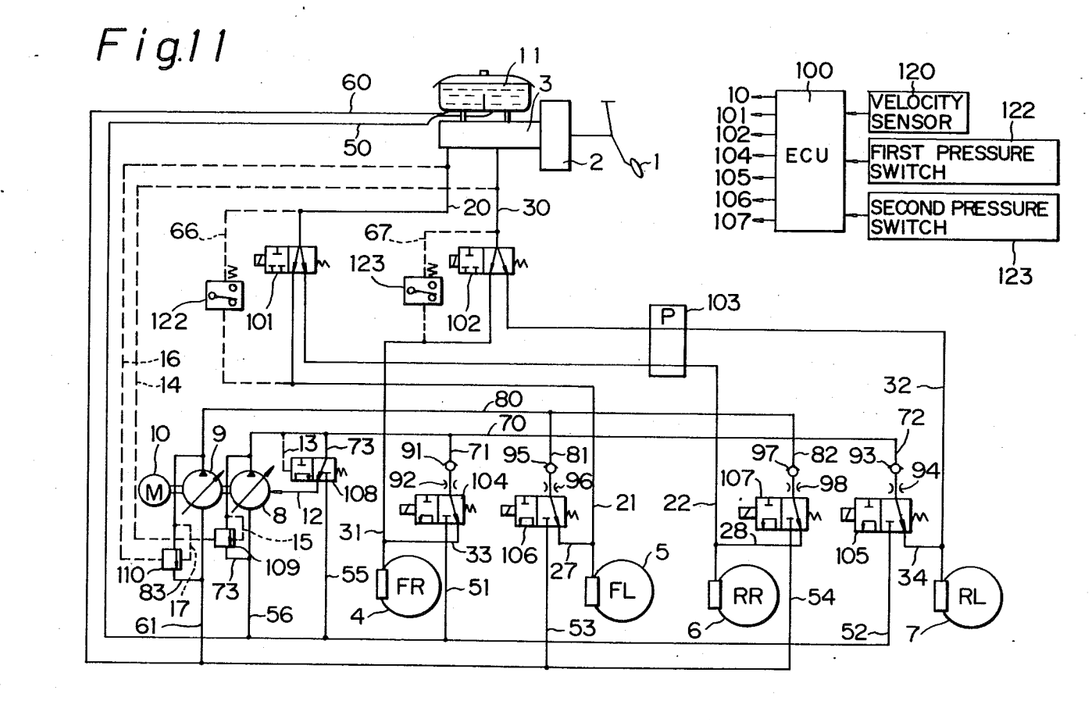
FIG. 11 is a hydraulic circuit of a fourth embodiment of the present invention.

FIG. 11 shows a fourth embodiment of the present invention. In the drawing, a pressure line 66 provided with a first pressure switch 122 connects the supply line 20 to the brake line 21. The first pressure switch 122 senses a pressure difference between an upstream portion of the cut-off valve 101 and a downstream portion of the cut-off valve 101. This is, the pressure switch 122 senses a pressure PM in the supply line 20 receiving a pressure of the master cylinder 3 and senses a pressure PW in the brake line 21 receiving a pressure of the wheel cylinder 5, at the same time. The pressure switch 122 is closed when the pressure PW is higher than the pressure PM by a predetermined value, to send a signal to the ECU 100. The ECU 100 switches the cut-off valve 101 to the first valve position shown in the drawing and quickly halts the motor 10 when receiving the signal in an antiskid control, to stop the antiskid control.

Similarly, a pressure line 67 provided with second pressure switch 123 connects the supply line 30 to the brake line 31. The second pressure switch 123 senses a pressure PM in the supply line 30 receiving a pressure of the master cylinder 3 and senses a pressure PW in the brake line 31 receiving a pressure of the wheel cylinder 4, at the same time. The pressure switch 123 is closed when the pressure PW is higher than the pressure PM by a predetermine value to send signal to the ECU 100. The ECU 100 sends a signal to switch the cut-off valve 102 to the first valve position shown in the drawing and quickly halts the motor 10 when an antiskid control is carried out. The remaining construction is the same as that of the first embodiment shown in FIG. 1.

Figure 4:
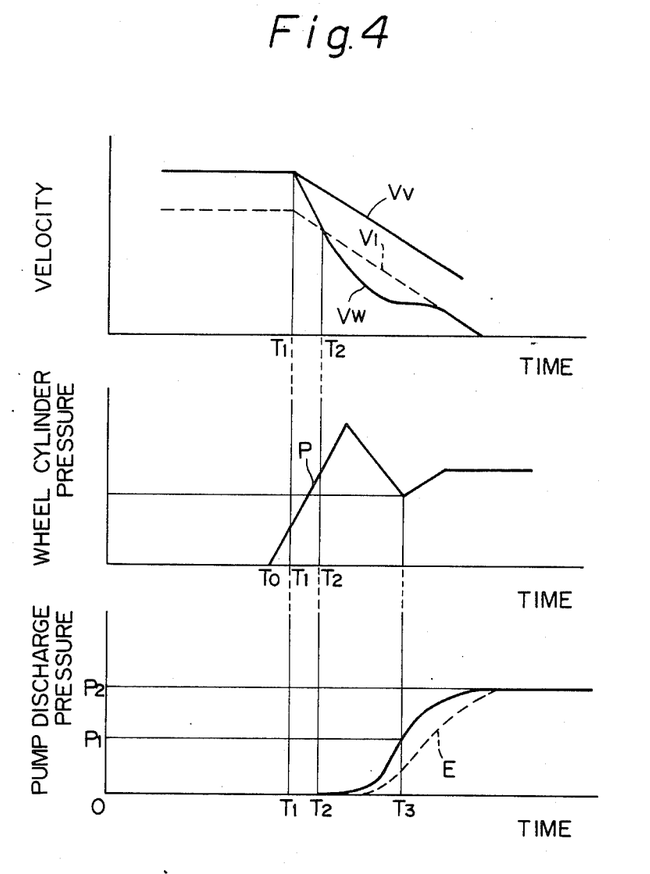
FIG. 4 is a diagram showing a variation of a vehicle velocity, a wheel velocity, a wheel cylinder pressure, and a pump discharging pressure.

An antiskid control by the fourth embodiment is carried out as shown in FIG. 4 described in connection with the first embodiment.

In an antiskid control, if the driver reduces the force exerted on the brake pedal 1, to reduce the braking force, the pressures in the wheel cylinders 4, 5, 6, and 7 must be reduced in response to the reduced pressure in the master cylinder 3. In such a case, the pressure switches 122 and 123 sense that the pressure in the master cylinder 3 has become lower than the pressure in the wheel cylinders 4, 5, 6, and 7 by a constant value, so that the motor 10 is halted and the cut-off valves 101 and 102 are opened to allow the wheel cylinders 4, 5, 6, and 7 and the master cylinder 3 to communicate. As a result, the pressure in the wheel cylinder 4, 5, 6, and 7 becomes equal to the pressure in the master cylinder 3, namely, the pressures in the wheel cylinders 4, 5, 6, and 7 are reduced, and the pressure in the master cylinder 3 becomes a value corresponding to the force with which the brake pedal 1 is operated.

In an antiskid control, if the discharge pressures of the pumps 8 and 9 becomes abnormally high due to a failure of the relief valves 109 and 110, so that pressures in the wheel cylinders 4, 5, 6, and 7 become higher than a predetermined value, the pressure switches 122 and 123 sense this condition, communicate the wheel cylinders 4, 5, 6, and 7 with the master cylinder 3, and halt the motor 10. Therefore, rupture of the piping system of the brake system is prevented when an abnormally high pressure occurs.

Note that, in the above fourth embodiment, the pressure switches 122 and 123 can be substituted by another device, such as a pressure sensor by which the pressure difference is sensed and an electric signal ouput. Further, although the pressure switches 122 and 123 are provided in only the oil lines for the front wheels in the above embodiment, the pressure switches also can be provided in the oil lines for the rear wheels.

Figure 12:
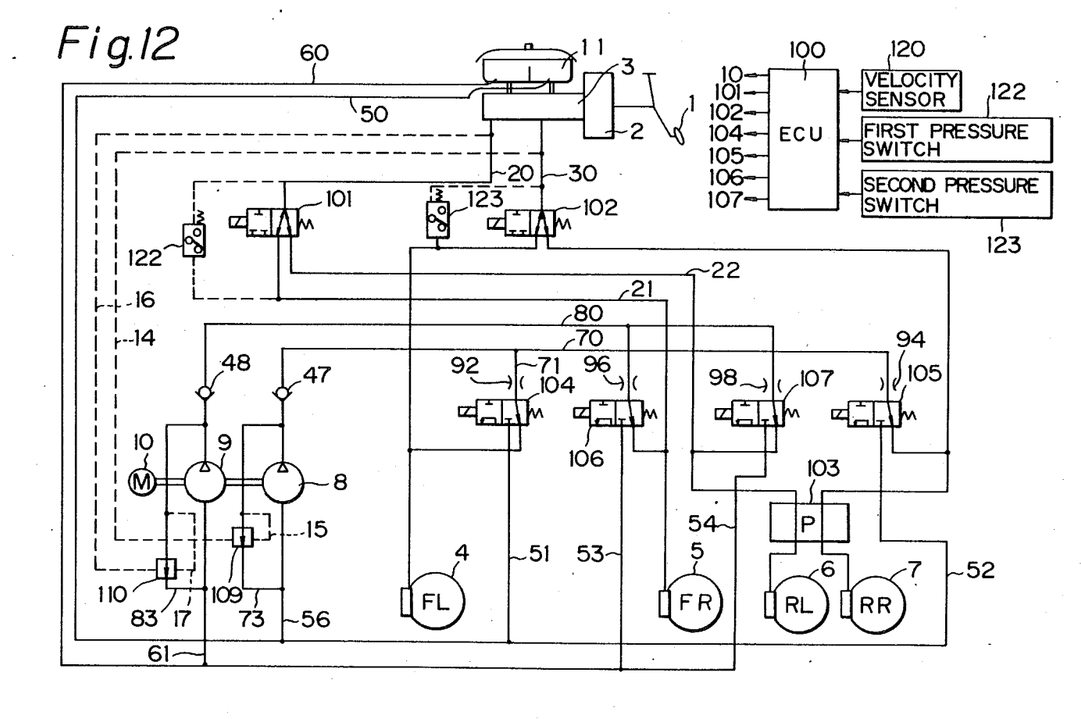
FIG. 12 is a hydraulic circuit of a fifth embodiment of the present invention.

FIG. 12 shows a fifth embodiment of the present invention. In this embodiment, the check valves 91, 93, 95, and 97 in the fourth embodiment are not provided in the branch lines 71, 72, 81, and 82, but check valves 47 and 48 are provided in the sublines 70 and 80, respectively, which are connected to the discharge ports of the pumps 8 and 9. The proportioning valve 103 is provided between the switching valves 105 and 107 and the wheel cylinders 6 and 7. The pumps 8 and 9 are constant delivery pumps. The remaining construction and operation are the same as that of the fourth embodiment.

While embodiments of the present invention have been described herein with reference to the attached drawings, many modifications and changes may be made by those skilled in this art without departing from the scope of the invention.

We claim:

1. An antiskid control device controlling pressure in the wheel cylinders of a brake system provided in a vehicle for preventing the vehicle from skidding through locking of the wheels thereof, said device comprising:
   a first hydraulic oil source generating pressurized oil for a usual brake operation,
   a second hydraulic oil source generating pressurized oil for an antiskid control brake operation,
   a hydraulic oil reservoir containing a supply of hydraulic oil and connected to said first and to said second hydraulic oil sources and supplying oil thereto,
   a main line system having a main line connecting said first hydraulic oil source to said wheel cylinders, and a cut-off valve for opening and closing said main line,
   a means for switching said cut-off valve to normally open said main line, and to close said main line when a locking condition occurs in said wheels of the vehicle,
   a subline system having a subline connecting said second hydraulic oil source to said wheel cylinders, and a switching valve opening and closing said subline, said switching valve having first, second, and third ports connected, respectively, to said second hydraulic oil source, the wheel cylinders, and said reservoir, and
   a means for controlling said switching valve to open or close according to the locking condition of the wheels.

2. An antiskid control device according to claim 1, wherein said first hydraulic oil source is a master cylinder provided in the brake system.

3. An antiskid control device according to claim 1, wherein said second hydraulic oil source has a motor, and an hydraulic oil pump rotated by said motor.

4. An antiskid control device according to claim 1, wherein said second hydraulic oil source is a variable delivery pump.

5. An antiskid control device according to claim 4, wherein said variable delivery pump discharges a small flow rate quantity of oil when a discharge pressure is relatively high, and discharges a large flow rate quantity of oil when a discharge pressure is relatively low.

6. An antiskid control device according to claim 1, further comprising a pressure difference sensor for detecting a pressure difference between a wheel cylinder pressure and a master cylinder pressure, and
   a means for halting the antiskid control,
      said halting means opening said cut-off valve and stopping the operation of said second hydraulic oil source when said wheel cylinder pressure becomes higher than said master cylinder pressure.

7. An antiskid control device according to claim 1, further comprising a pressure sensor detecting a presure in said first hydraulic oil source, and
   a means for starting operation of said second hydraulic oil source.
   said starting means starting said second hydraulic oil source to generate a pressurized oil according to the master cylinder pressure.

8. An antiskid control device according to claim 7, further comprising a wheel velocity sensor, said starting means starting said second hydraulic oil source to generate a pressurized oil when the master cylinder pressure is more than a predetermined value and the wheel velocity is more than a predetermined value.

9. An antiskid control device according to claim 1, further comprising a first means for suppressing a discharge pressure of said second hydraulic oil source when said discharge pressure becomes higher than said first hydraulic oil source pressure.

10. An antiskid control device according to claim 9, wherein said first suppressing means is a main relief valve connected to a discharge portion of said second hydraulic oil source, said main relief valve being subjected to a discharge pressure of said first hydraulic oil source to suppress a discharge pressure of said second hydraulic oil source.

11. An antiskid control device according to claim 1, further comprising a means for suppressing a discharge pressure of said second hydraulic oil source when said discharge pressure becomes higher than a sum of a pressure in said wheel cylinder and a predetermined value.

12. An antiskid control device according to claim 11, wherein said suppressing means is a subrelief valve connected to a discharge portion of said second hydraulic oil source said subrelief valve being subjected to the pressure in said wheel cylinder to suppress the discharge pressure of said second hydraulic oil source.

13. An antiskid control device according to claim 1, wherein said braking system comprises a plurality of wheel cylinders, a switching valve being connected to each of the wheel cylinders for selectively connecting a respective wheel cylinder between said second hydraulic oil source and said reservoir.

14. An antiskid control device according to claim 1, wherein said braking system comprises a plurality of wheel cylinders divided into a first and a second group and a plurality of second hydraulic oil sources, the wheel cylinders of each group selectively communicating with a respective second hydraulic oil source.

15. An antiskid control device according to claim 1, wherein said second hydraulic oil source is selectively operable to provide pressurized hydraulic oil and is operated during an antiskid control braking operation to provide pressurized hydraulic oil and further comprising check valves in said subline between said second hydraulic oil source and said switching valve.

* * * * *